United States Patent [19]

Fujioka et al.

[11] Patent Number: 4,792,800

[45] Date of Patent: Dec. 20, 1988

[54] LOCAL COMMUNICATION SYSTEM AMONG ISDN TERMINAL EQUIPMENTS

[75] Inventors: Masanobu Fujioka; Yoshikazu Ikeda; Nobuo Furuya, all of Tokyo, Japan

[73] Assignee: Kobusai Denshin Denwa Co., Ltd., Tokyo, Japan

[21] Appl. No.: 883,402

[22] Filed: Jul. 8, 1986

[30] Foreign Application Priority Data

Aug. 1, 1985 [JP] Japan ................. 60-168582

[51] Int. Cl.$^4$ ........................................ H04Q 11/04
[52] U.S. Cl. ......................... 340/825.05; 340/825.04; 370/85; 370/110.1
[58] Field of Search ................. 340/825.03, 825.04, 340/825.05, 825.5; 370/15, 58, 65, 67, 85, 88, 86, 105, 110.1, 111; 375/20, 17; 379/93, 94, 95

[56] References Cited

U.S. PATENT DOCUMENTS

| | | | |
|---|---|---|---|
| 4,592,045 | 5/1986 | Fundneider | 370/110.1 |
| 4,611,336 | 9/1986 | Fryer | 370/105 |
| 4,635,255 | 1/1987 | Clark et al. | 370/110.1 |
| 4,663,748 | 5/1987 | Karbowiak et al. | 340/825.5 |
| 4,688,208 | 8/1987 | Kawaguchi | 370/15 |
| 4,689,789 | 8/1987 | Herger | 370/67 |

FOREIGN PATENT DOCUMENTS 3402978  8/1985  Fed. Rep. of Germany ........ 379/94

OTHER PUBLICATIONS

Wienski, "Evolving to ISDN within the Bell Operating Companies", IEEE Communications Magazine, Jan. 1984, vol. 22, No. 1.

Primary Examiner—John W. Caldwell, Sr.
Assistant Examiner—Edwin C. Holloway, III
Attorney, Agent, or Firm—Armstrong, Nikaido, Marmelstein & Kubovcik

[57] ABSTRACT

A local communication system among ISDN terminal equipment in a user's premises are connected to a local passive bus of the LSDN basic-access interface. The present system can establish the local communication through a network termination unit among ISDN termination equipment. In order to establish such a local communication, a multiframing scheme is taken on a passive bus forming multiframes by combining together the predetermined number of frames which are as defined in the I.400 series of CCITT recommendations. The network termination unit has a switching device for coupling two circuit-switched type communication channels (B1, B2) on the passive bus in one direction of transmission with the two other channels (B2, B1) in the other direction to establish local communication. Alternatively, the switching device couples the two channels on the passive bus with those on the subscribed line to establish external communication. Each of the terminal equipments has a device for requesting the local communication when required.

3 Claims, 8 Drawing Sheets

Fig. 3

LOCAL COMMUNICATION SYSTEM AMONG ISDN TERMINAL EQUIPMENTS

BACKGROUND OF THE INVENTION

The present invention relates to a local communication system among terminal equipment in a user's premises which are connected to a local passive bus and, in particular to the improvement of a system having an ISDN (Intergrated Services Digital Network) basic-access user-network interface as defined in the I.400 series of CCITT recommendations. In such a system, the invention provides a circuit-switched type of local communication capability among ISDN terminal equipment (which means terminal equipment defined in the CCITT recommendations).

Configurations, many kinds of characteristics, and signal formats at the ISDN user-network interface were standardized as the I.400 series of recommendations by CCITT in 1984. The configurations of a standardized reference interface are as follows. Referring to FIG. 1, an ISDN user-network interface comprises a local switch (LS) 13 and a network termination unit (NT) 11 which terminates a digital subscriber line 14 extended from the LS. The NT is installed in the user's premises. A plurality of terminal equipment (TEs) 21, 22, . . . , 28 are connected through corresponding sockets 31, 32, . . . , 38 to a local passive bus (PB) 12 of a 4-wire metallic cable which is extended from the NT. Two wires 12a of the passive bus 12 are used for the signal transmission in the direction from the NT towards the TEs 21, 22, . . . , 28, and the remaining two wires 12b are used for signal transmission in the direction from the TEs 21, 22, . . . , 28 towards the NT.

FIG. 2 illustrates frame structures for signal transmission on the passive bus 12a and 12b. One frame on each bus is composed of 48 bits (corresponding to 250 μs). Each of frames on the passive bus 12a has the same structure, which are repeatedly transmitted from the NT. Likewise, each of the frames on the passive bus 12b has the same structure. These frames are repeatedly transmitted from each TE. The frame for each direction contains bits of the two B-channels (B1-channel and B2-channel, each having a bit rate of 64 kbps) and bits of the D-channel (having a bit rate of 16 kbps) and are indicated as characters B1, B2 and D, respectively, in FIG. 2. The B1-channel and B2-channel are used for transmission of a circuit-switched type of communication information. The D-channel is used for out-of-band transfer of a control signal for establishment or release of the B1-channel and B2-channel between individual TEs and the NT, as well as for transfer of a packet type of communication information. One frame contains 16 of B1-bits, 16 of B2-bits and 4 of D-bits. On the passive bus 12a, E-bits for an E-channel are transmitted in one frame in addition to bits for the B1-channel, B2-channel and D-channel. Each E-bit has a copy of the D-bit on the passive bus 12b (TE→NT) which has lastly been received transmitting the E-bit. The E-bits, which are monitored by each terminal equipment, are used for avoiding an access collision on the passive bus 12 to ensure that, even in cases where two or more terminals attempt to access the D-channel simultaneously, one terminal will always be successful in completing transmission of its information. Furthermore, one frame on the passive bus 12a contains, in addition to the bits for the channels mentioned above, a framing bit (F) 46, a bit (A) 47 used for activation of the TEs, an auxiliary framing bit ($F_A$) 44, a bit (N) 45 set to a binary value $N = \overline{F}_A$, spare bits (S1, S2) 41, 42 and DC balancing bits (L). On the other hand, one frame on the passive bus 12b (TE→NT) further contains a framing bit (F) 51, an auxiliary framing bit ($F_A$) 52 and DC local balancing bits (L). In FIG. 2, dots attached to the local balancing bits (L) demarcate those parts of the frame, each part consisting of the bit following the last L bit through the L bit considered, that are independently DC-balanced.

AMI (Alternative Mark Inversion) codes with 100% pulsewidths are used as the transmission codes on the passive bus 12. Coding is performed in such a way that a binary one is represented by no pulse, whereas a binary zero is represented by a positive or negative pulse. In general, the binary zero bit has the polarity opposite to that of the binary zero bit just prior to the bit. The frame synchronization at the terminal equipment (TE) 21, 22, . . . , 28 is established by using a violation between the L-bit 50 on the passive bus 12a (which is always a negative pulse of binary zero) which follows the F-bit 46 (which is always a positive pulse of binary zero) and a binary zero bit which first occurs after the L-bit 50. This violation on the passive bus 12a is performed in such a way that the first binary zero bit following the L-bit 50, which should generally be the positive pulse, is intentionally made a negative pulse to indicate that the negative pulse prior to the pulse whose polarity has been intentionally inverted is the L-bit 50, as shown in FIG. 2. The violation can also be established by using the auxiliary framing bit ($F_A$) 44, even when all the bits from the B1-bit 43 following the L-bit 50 to the A-bit 47 are binary ones. This violation satisfies the CCITT recommendation that on the passive bus 12a, there should always be a violation at the 14th bit or sooner from the framing bit (F) 46. Each of the TEs 21, 22, . . . , 28, detecting the F-bit 46 on the passive bus 12a, begins to send the F-bit 51 after two bits offset with respect to the F-bit 46 of the frame delivered from the network termination unit NT. Also in this case, the frame alignment in the direction TEs towards NT is established by using the violation between the L-bit 57 (which is always a negative pulse of binary zero) following the F-bit 51 and a binary zero bit which first occurs after the L-bit 57. When all the B1-bits 54 to 55 and the D-bit 56, which are between the F-bit 51 and the $F_A$-bit 52, are binary ones, the violation can be brought out by using the $F_A$-bit 52. Therefore, this violation satisfies the CCITT recommendation that on the passive bus 12b, there should always be a violation at the 13th bit or sooner from the framing bit ($F_A$) 51.

In the frame structures of FIG. 2, a L-bit is a DC balancing bit for keeping a zero DC component of the region between the bit following the previous L-bit and the present L-bit. For instance, the L-bit 48 becomes a binary zero pulse of positive polarity when there exists one bit of negative DC component in the range from the B1-bit 43 to the D-bit 49. On the other hand, the L-bit 48 becomes a binary one when there exists no DC component in that range. The L-bit 57 is always a negative pulse of binary zero as described above, because the F-bit 51 is always a positive pulse of binary zero. FIG. 2 also illustrates possible electric levels of each bit. For example, the F-bit 46 is always a positive pulse and the B1-bit 43 can become either a negative pulse or no pulse.

However, the prior user-network interface mentioned above has the following disadvantage. In the configuration of the prior art, it is desirable to enable local communication among the terminals (TEs) 21, 22, ..., 28 in the user's premises. According to the prior system, such a communication among terminals (referred to as local or inner communication hereinafter) can be performed only by a switching function of the local switch (LS) 13, because the network termination unit (NT) has no switching function for the two B-channels, allowing circuit-switched type local communication. Consequently, the prior art has the disadvantage that the local communication loads can not be realized without aid of the network or local switch.

SUMMARY OF THE INVENTION

It is an objective of the present invention, therefore, to overcome the disadvantage of a prior ISDN user-network interface by providing a new and improved local communication system among ISDN terminal equipment.

It is also an objective of the present invention to provide a local communication function which does not need functions of the network.

According to the present invention, a circuit-switched type of local communication among terminal equipment within a user's premises can be established through a network termination unit. Nevertheless, the present invention satisfies the present CCITT recommendation: it retains physical and electrical reference characteristics defined in the CCITT recommendation. In order to achieve such a local communication according to the present invention, only minimum functions are added to the network termination unit and terminal equipment.

The above and the other objectives are realized by a local communication system among ISDN terminal equipment inside a user's premises through a network termination unit in the user's premises, which terminates a subscriber line from a network to the user's premises. Passive bus connects the terminal equipment to the network termination unit. The passive bus has a both-way or two-way communication function containing two circuit-switched type of communication channels. Signals on the passive bus in two directions of transmission are transferred according to a predetermined frame structure having bits for the communication channels. A multiframe is configured on the passive bus by combining the predetermined number of the frames together by utilizing an auxiliary framing bit in each frame. The network termination unit comprises a switching device for coupling the two channels on the passive bus in one direction of transmission with the two channels on the passive bus in the other direction to establish a loop-backed connection for a local communication among the terminal equipment through the network termination unit. The switching device also couples the passive bus with the subscriber line to establish a connection for an external communication. Each of the terminal equipment comprises a device for requesting the loop-backed connection for the local communication, by controlling the auxiliary framing bits of the frame in the multiframe. When the loop-backed connection is requested by the terminal equipment, the switching device in the network termination unit changes the connection for the external communication into that for the loop-backed connection.

BRIEF DESCRIPTION OF THE DRAWINGS

Further objects, features and advantages of the present invention can be more fully understood by means of the following description and accompanying drawings wherein:

FIG. 3 illustrates the principle of multiframe structure according to the present invention.

DESCRIPTION OF THE PREFERRED EMBODIMENTS

Figure 1:
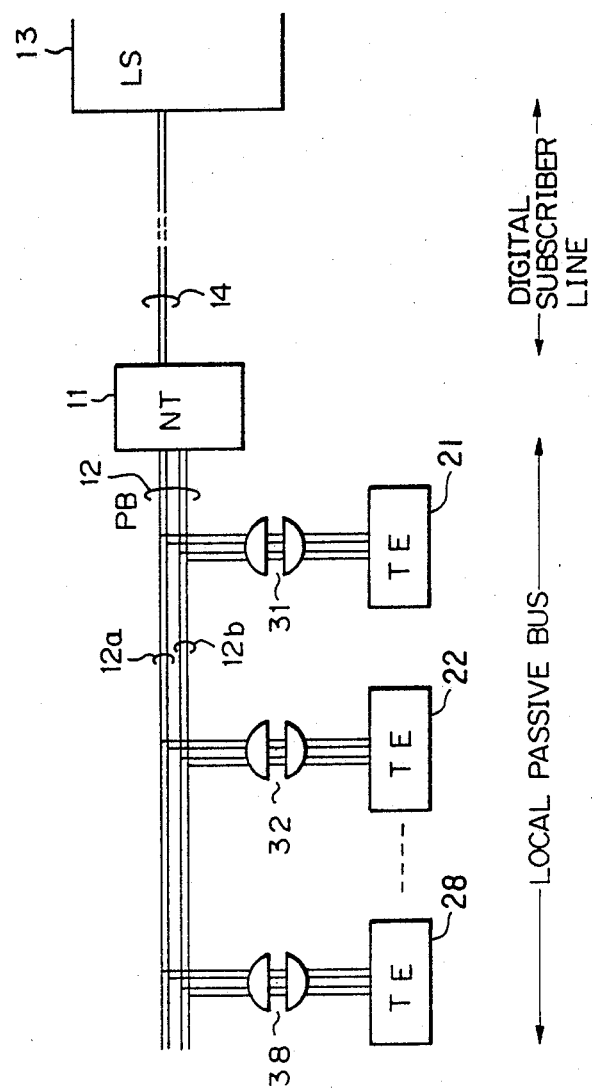
FIG. 1 is a block diagram of an ISDN user-network interface defined in the I.400 series of CCITT recommendation.

The description will now be given of a multiframe structure according to the present invention. One multiframe on each direction of the passive bus 12a and 12b is composed of a set of (n) consecutive frames (n≦4), based on the frame structure shown in FIG. 2. The multiframe on the passive bus 12a (NT→TE) is established by using the $F_A$-bit 44 and the N-bit 45 shown in FIG. 2. The multiframe on the passive bus 12b (TE→NT) is established by using the $F_A$-bit 52 shown in FIG. 2. The reason why the multiframe is used is to get auxiliary bits by combining (n) frames to obtain a capability for information transmission and to use them for establishing local communication through the network termination unit.

Figure 3:
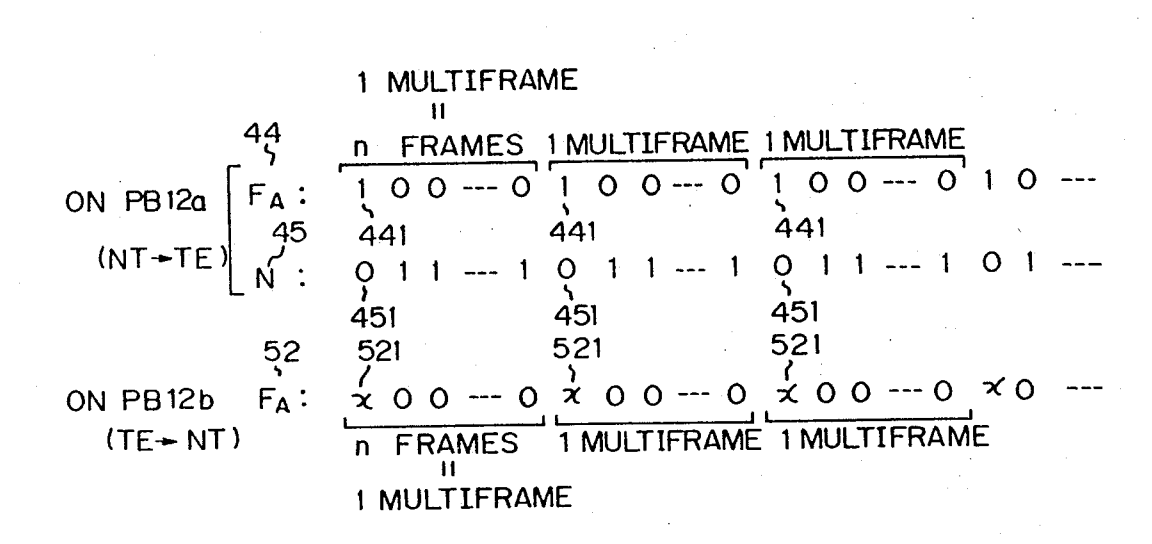

Referring to FIG. 3 which shows the basic structure of multiframes according to the present invention, on the passive bus 12a (NT→TE). A $F_A$-bit 441 of the first frame of each multiframe, composed of (n) frames, is used as a multiframing bit. That is, the $F_A$-bit 441 of the first frame in a multiframe is fixed to the binary one. The $F_A$-bits 44 of the remaining frames in the same multiframe are fixed to binary zeros. Each N-bit 45 is fixed to a binary value N=$\overline{F}_A$ with respect to the corresponding $F_A$-bit 44. Thus, each of the terminal equipment (TEs) 21, 22, ..., 28 can establish the multiframe alignment. According to this frame structure on the passive bus 12a, although it is impossible to bring about the violation for the frame alignment by using the $F_A$-bit of the first frame in each multiframe, it is possible to bring about the violation by using the N-bit in the first frame. Therefore, the multiframe structure on the passive bus 12a satisfies the CCITT recommendation that there should always be the violation at the 14th bit or sooner from the framing bit (F) 46.

Figure 2:
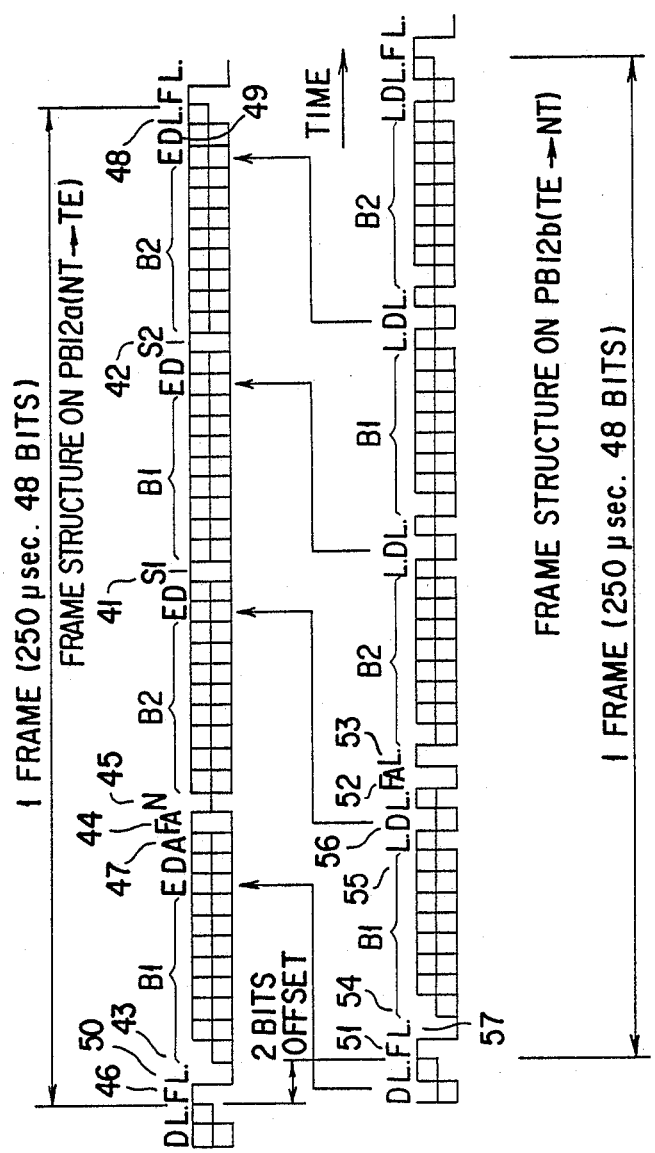
FIG. 2 illustrates the frame structure for signal transmission on a passive bus defined in the CCITT recommendation I.430.

On the other hand, on the passive bus 12b (TE→NT), a $F_A$-bit 52 of the first frame of each multiframe composed of (n) frames is used as an x-bit 521 for multiframe alignment, in synchronization with the multiframe transmitted from the NT. The x-bit 521 is fixed to the binary one when the B1-channel and B2-channel on the passive bus 12b are not requested to be loop-backed in the (NT) 11 to the B2-channel and B1-channel on the passive bus 12a, respectively, to establish the local communication through the (NT) 11. As to the first frame of each multiframe, this fixing of the x-bit 521 does not satisfy the CCITT recommendation that there should always be a violation at the 13th bit or sooner from the F-bit 51, when all the B1-bits 54 to 55 and the D-bit 56 in FIG. 2 are all binary ones. However, also the recommendation defines that loss of frame alignment is assumed only when no violation is detected by the NT at the 13th bit or sooner from the F-bit 51 in two consecutive frames on the passive bus 12b. Consequently, loss of the frame alignment does not take place even when the violation is not detected in only the first frame of each multiframe. On the contrary, the NT 11 finds that the frame alignment has been established when it detects the violation at the 13th bit or sooner from the F-bit in three consecutive frames on the passive bus 12b. Thus, the number (n) of frames composed of one multiframe has to be equal to or more than four.

When the terminal 21, for example, requests the establishment of a loop-backed connection for coupling the B-channels on the passive bus 12b with those on the passive bus 12a in the network termination unit NT, it sets the x-bit 521 to binary zero in each multiframe on the passive bus 12b. The x-bit 521 of binary zero is continuously sent while the retension of the loop-backed connection is requested by the terminal equipment 21. In this case, the network termination unit NT 11 determines that the x-bit 521 is the binary zero by the wired-AND logic on the passive bus 12b, even when the other therminal equipment (TEs) 22, 23, . . . , 28 set the respective x-bits 521 to binary ones and send them on the passive bus 12b.

Figure 4:
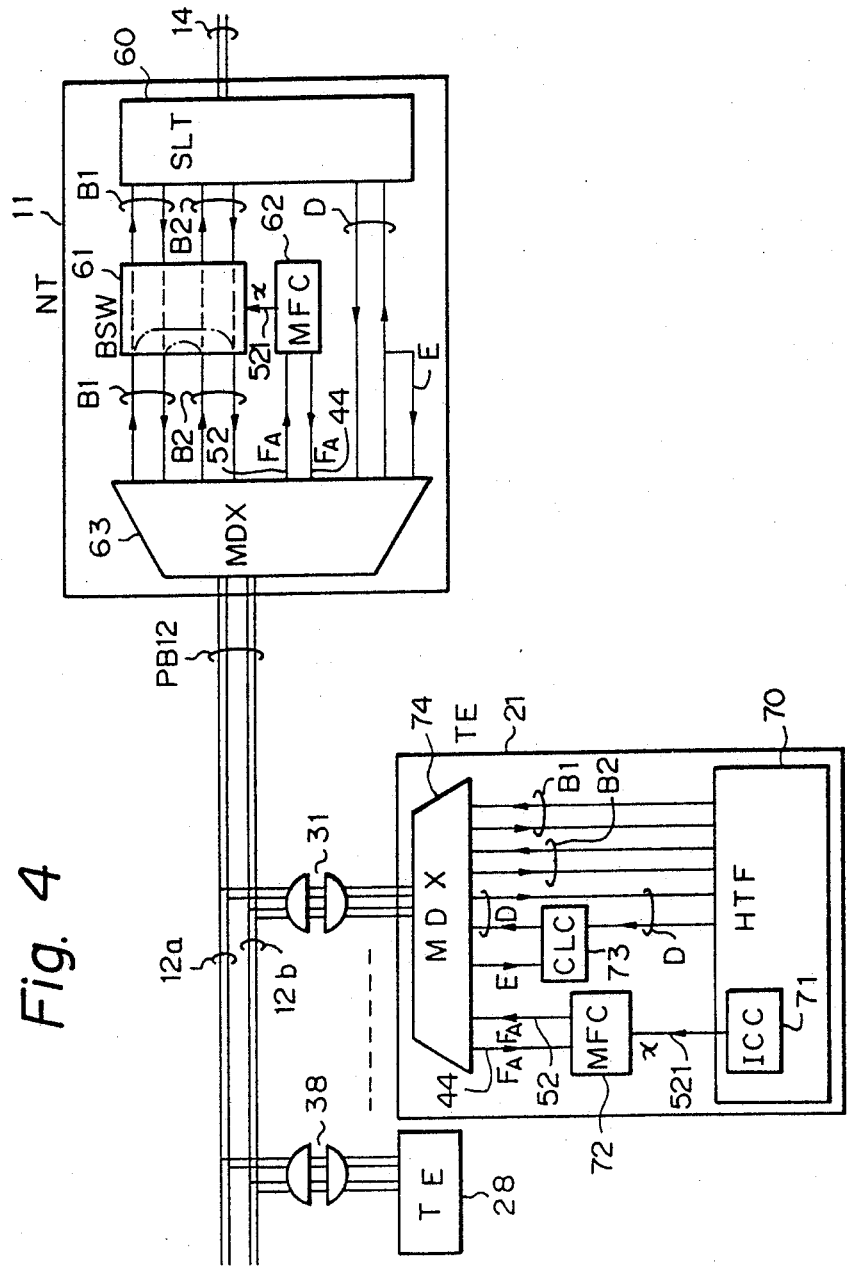
FIG. 4 is a block diagram of the principle of a system configuration in ISDN user's premises according to the present invention.

Referring to FIG. 4 which illustrates the basic system configuration in an ISDN user's premises according to the present invention, a subscriber line termination circuit (SLT) 60 in the NT terminating a digital subscriber line 14, demultiplexes a signal on the subscriber line 14 into the three discrete channels B1, B2 and D and, on the other hand multiplexes a signal of each channel in the NT to send a multiplexed information on the subscriber line 14. A multiplexer-demultiplexer (MDX) 63 which terminates the passive bus 12 demultiplexes a signal on the passive bus 12b into the channels B1, B2 and D, and the other control bits such as the $F_A$-bit 52 and, on the other hand multiplexes the channels B1, B2 and D, and the other control bits such as the $F_A$-bit 44 in the NT to send a multiplexed signal on the passive bus 12a. A multiframe control circuit (MFC) 62 generates the $F_A$-bits 44 to be sent on the passive bus 12a and, on the other hand extracts x-bit 521 from $F_A$-bits 44 received on the passive bus 12b. A B-channel switch (BSW) 61 loop-backs the B1-channel and B2-channel received from the passive bus 12b to the B2-channel and B1-channel on the passive bus 12a, respectively.

A multiplexer-demultiplexer (MDX) 74 in each of the terminal equipment 21, 22, . . . , 28, terminating the passive bus 12, demultiplexes a signal on the passive bus 12a into the channels B1, B2, D and E and the other control bits such as the $F_A$-bit 44 and, on the other hand multiplexes bits of each channel and the other control bits such as the $F_A$-bit 52 to then send a multiplexed signal on the passive bus 12b. A local or inner communication controller (ICC) 71 in a high-level terminal function circuit (HTF) 70 sets the x-bit 521 to binary zero when the circuit-switched type local communication or loop-backed connection is requested and, on the other hand, sets x-bit 521 to binary one when no local communication is requested. A multiframe control circuit (MFC) 72 receives x-bit 521 from the ICC and generates the $F_A$-bit 52 to be sent on the passive bus 12b in synchronization with the $F_A$-bit 44. A collision control circuit (CLC) 73 monitors the E-bit to avoid the access collision for the D-channel on the passive bus 12b.

The switch (BSW) 61 in the NT connects the B1-channel and B2-channel on the passive buses 12 to the B1-channel and B2-channel on the subscriber line 14, respectively as shown by dotted lines in FIG. 4, while the x-bit 521 transmitted from the TEs 21, 22, . . . , 28 is set to binary one. On the other hand, the switch 61 establishes the loop-backed connection between the B1-channel and the B2-channel on the passive bus 12, as shown by dashed and dotted lines, while the x-bit 521 derived from the terminal equipment (TE) 21, for instance, is set to binary zero and the x-bit derived from the multiframe control circuit MFC is also binary zero. Therefore, for example, the local communication between the terminal equipment 21 and the terminal equipment 28 can be established by using the B1-channel and B2-channel.

Figure 5:
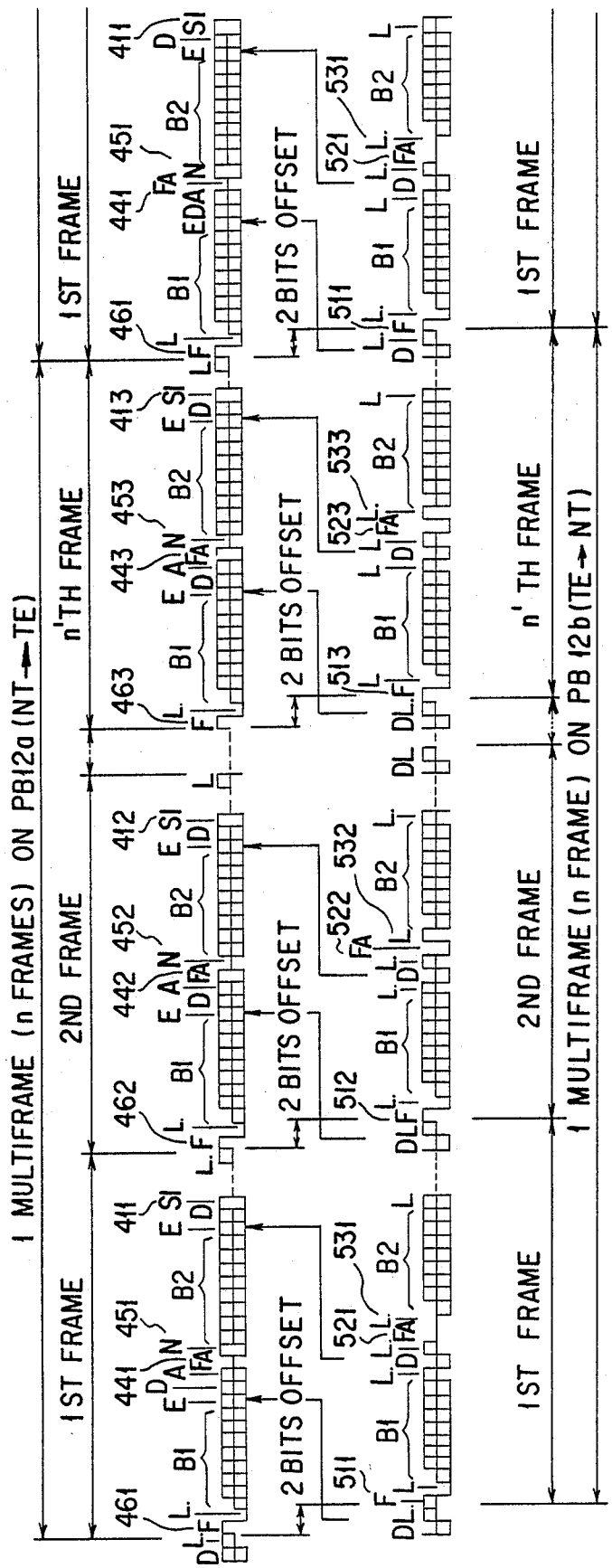
FIG. 5 illustrates detailed multiframe structures in the case where a loop-backed connection between a B1-channel and a B2-channel in a network termination unit is not activated or requested in the present invention.

FIG. 5 illustrates detailed multiframe structures in the case where the loop-backed connection between the B1-channel and the B2-channel in the network termination equipment (NT) 11 is not activated or requested. As described before referring to FIG. 3, one multiframe is composed of (n) frames and one frame is composed of 48 bits (250 μsec). On the passive bus 12a (NT→TE), the $F_A$-bit 441 of the first frame of each multiframe is fixed to the binary one, while the N-bit 45 following the $F_A$-bit 441 is fixed to the binary zero. On the other hand, on the passive bus 12b, the $F_A$-bit 521 (the x-bit) of the first frame of each multiframe is always fixed to the binary one, and the L-bit 531 following the $F_A$-bit 521 is also fixed to the binary one while the loop-backed connection is not requested. Bits other than those bits mentioned above are the same as those shown in FIG. 2. The frame structures of the second frame to the n'th frame in each multiframe are also the same as those shown in FIG. 2.

Figure 6:
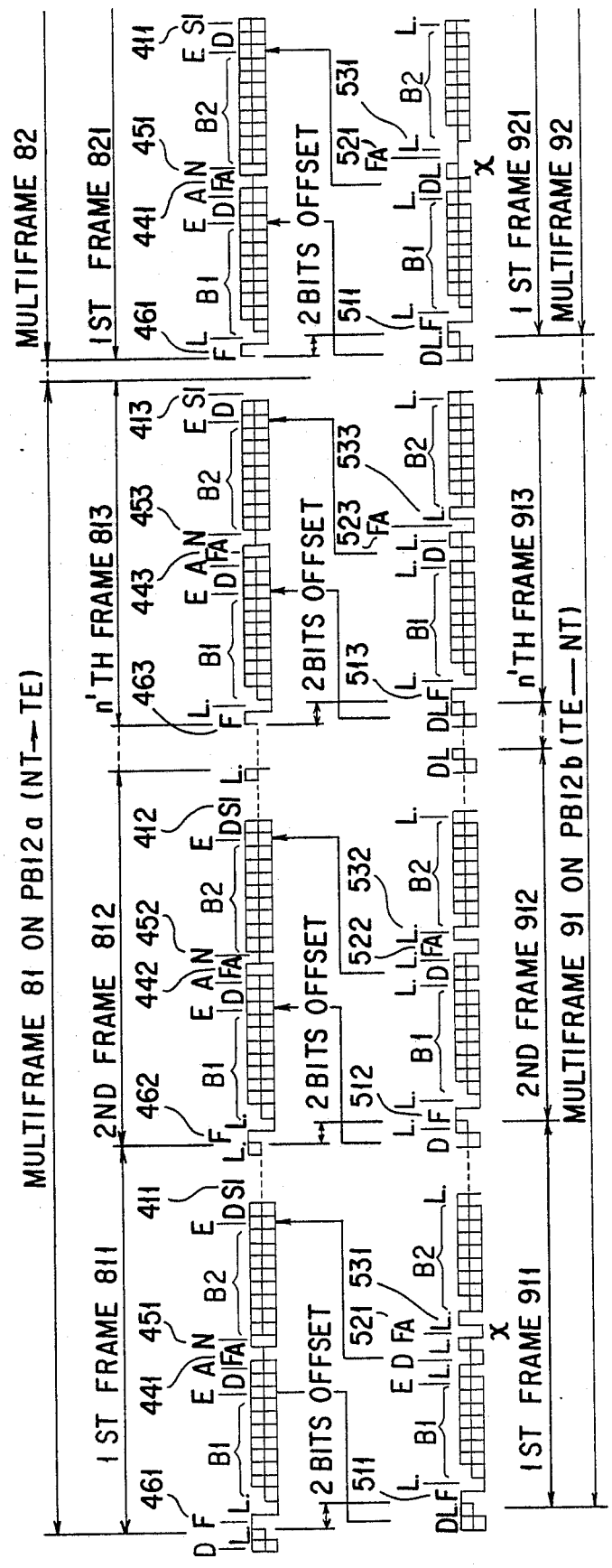
FIG. 6 illustrates one example of multiframe structures on the passive bus in the case where the loop-backed connection between the B1-channel and the B2-channel in the network termination unit is established and released in the present invention.

FIG. 6 illustrates one example of multiframe structures on the passive bus 12 in the case where the loop-backed connection between the B1-channel and the B2-channel in the NT is established and then is released. In this figure, the loop-backed connection for the local communication is established in the multiframe 91 and then is released in the multiframe 92. For instance, when the terminal equipment (TE) 21 sets the x-bit 521 and the following L-bit 531 of the first frame 911 in the multiframe 91 to be binary zeros, the network termination unit (NT) 11 establishes the loop-backed connection for the local communication in response to the x-bit 521 delivered from the TE-21. The network termination unit NT, when it finishes the establishment of the loop-backed connection, reverses the S1-bits 411, 412, . . . , 413 which have been set to binary zeros while not loop-backed to binary ones to inform each TE of completion of the loop-backed connection for the local communication. By this procedure, each TE 21, 22, ..., 28 is capable of recognizing the establishment of the local communication between the B1-channel and the B2-channel. On the other hand, as shown in the first frame 921 in the multiframe 92, when all the TEs 21, 22, ..., 28 stop setting the x-bit 521 and the following L-bit 531 to binary zeros, the NT determines that the x-bit 521 becomes binary one and thus releases the loop-backed connection. Then, the NT sets the S1-bits 411, 412, ..., 413 on the passive bus 12a (NT→TE) to binary zeros again and informs the TEs 21, 22, ..., 28 of the release of the loop-backed connection.

Although the S1-bit 41 is used in the above-mentioned multiframe structures in order that the NT informs all the TEs 21, 22, ..., 28 of completion of the establishment of the local communication, a S2-bit 42 may be used instead of the S1-bit 41. Further, although the NT establishes the loop-backed connection immediately once a x-bit 521 becomes binary zero in the embodiment mentioned above, the loop-backed connection may be established after the NT detects that several x-bits 521 are binary zeros, in order to avoid the effect of transmission errors.

Figure 7:
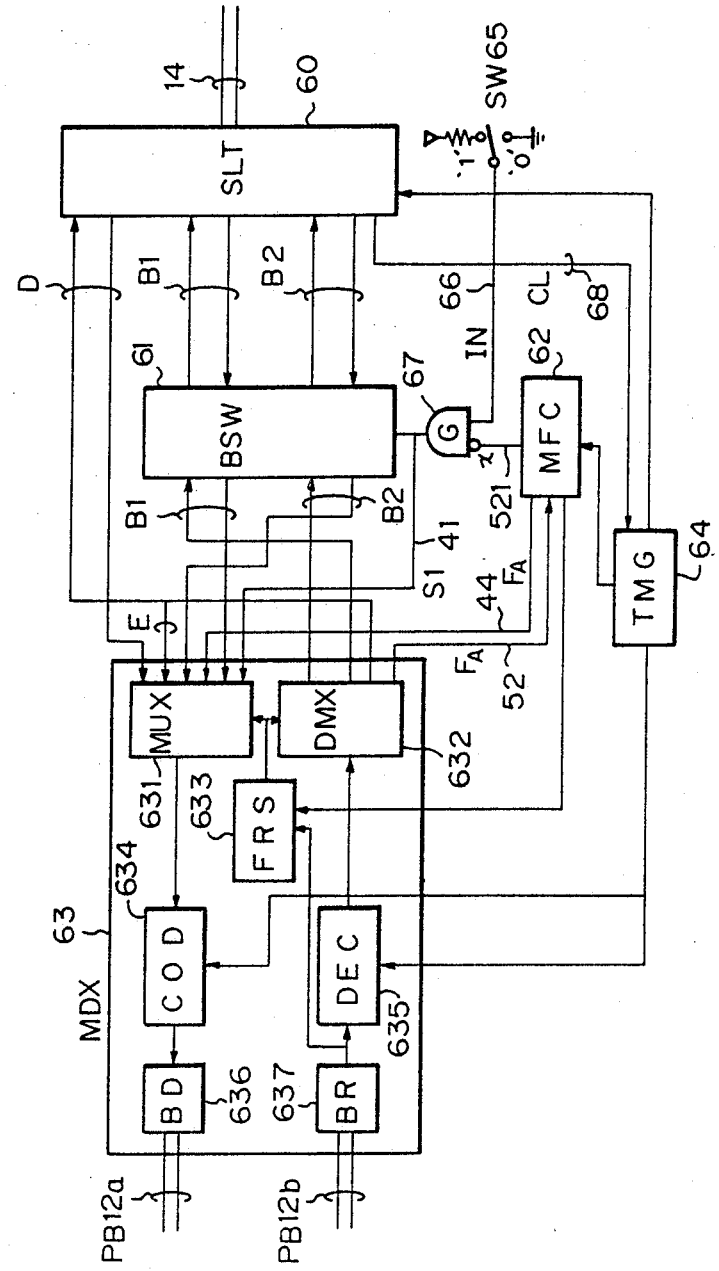
FIG. 7 is a block diagram of a detailed configuration of the network termination unit according to the present invention.

FIG. 7 illustrates a detailed configuration of the network termination unit (NT) 11 according to the present invention, for which its fundamental configuration has already been mentioned referring to FIG. 4 before. A multiplexer (MUX) 631 in the multiplexer-demultiplexer (MDX) 63 multiplexes the channels B1, B2, D and E and the other control bits such as the $F_A$-bits 44 and the S1-bits 41 in the NT, to then send those multiplexed bits to a coder (COD) 634. The coder 634 encodes the multiplexed bit sequence received from the MUX (631) into an AMI code adapted to the passive bus 12a, based upon a timing signal derived from a timing generator (TMG) 64, and then feeds the AMI code to a bus driver (BD) 636. The bus driver 636 converts the bit sequence of the AMI code fed from the coder 634 into an electric signal having levels and polarity adapted to the passive bus 12a and sends it on the passive bus 12a. A bus receiver (BR) 673 converts an electric signal on the passive bus 12b into an AMI code to be processed by the MDX (63) and then feeds it to a decoder (DEC) 635 and a frame synchronization circuit (FRS) 633. The DEC (635) converts the AMI code fed from the bus receiver (BR) 637 into a multiplexed bit sequence with normal logic levels based on the timing signal derived from the timing generator, and then feeds the bit sequence to a demultiplexer (DMX) 632. The demultiplexer (DMX) 632 demultiplexes the multiplexed bit sequence delivered from the decoder (DEC) 635 into each of the channels B1, B2 and D and the other bits such as the control bit $F_A$-bit 52. The frame synchronization circuit (FRS) 633, based on the frame alignment timing signal delivered from the multiframe control circuit (MFC) 62, extracts a received frame alignment signal from the AMI bit sequence received from the passive bus 12b to feed that received frame alignment signal to the demultiplexer (DMX) 632. Also, the frame synchronization circuit FRS supplies the multiplexer (MUX) 631 with a transmitted frame alignment signal, based on the frame alignment timing signal from the multiframe control circuit (MFC) 62. The timing generator (TMG) 64 generates the timing signal for transmission/reception of a signal, based on a timing signal (CL) 68 extracted from the subscriber line 14, and supplies it to the multiframe control circuit (MFC) 62, multiplexer-demultiplexer (MDX) 63 and subscriber line termination circuit (SLT) 60. The MFC (62) generates a framing signal and a multiframing signal, based on the timing signal delivered from the TMG, and supplies those signals to the frame synchronization circuit (FRS) 633. Also, the MFC generates the $F_A$-bit 44 and extracts the x-bit 521 from the received $F_A$-bit 52 to feed it to a gate circuit (G) 67. The gate (G) is provided to establish the loop-backed connection for the local communication only when the x-bit 521 from the MFC is the binary zero and a local communication designating bit (IN) 66 supplied by a switch (SW) 65 is binary one. The switch (SW) 65 is switchable to set the bit (TN) 66 to be either binary one or zero. The loop-backed connection is not established even when the x-bit 521 is the binary zero under the condition that the switch (SW) 65 is set to be the binary zero.

Figure 8:
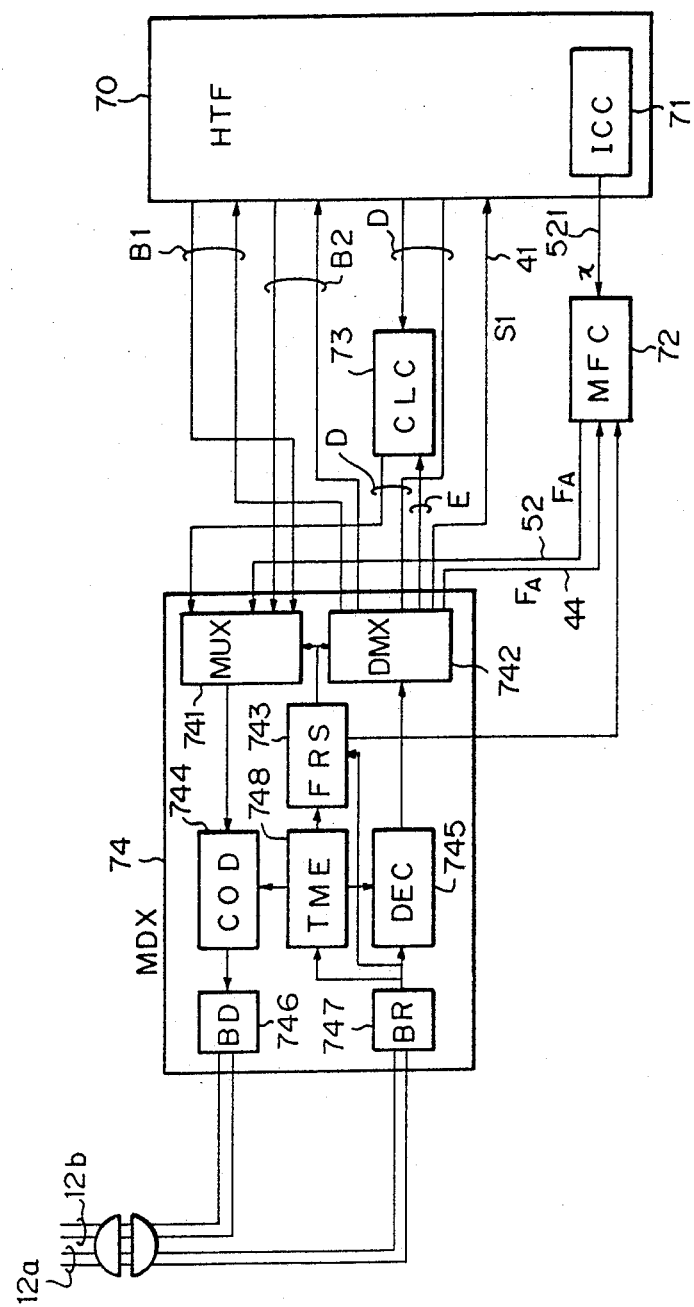
FIG. 8 is a block diagram of a detailed configuration of each terminal equipment according to the present invention.

FIG. 8 illustrates a detailed configuration of each of the terminal equipment (TEs) according to the present invention, for which its fundamental configuration has already been mentioned referring to FIG. 4 before. A multiplexer (MUX) 741 in the multiplexer-demultiplexer (MDX) 74 multiplexes bits of the channels B1, B2 and D and the other control bits such as the $F_A$-bit 52 and supplies the multiplexed signal to a coder (COD) 744. The COD (744) converts the multiplexed bit sequence from the MUX (741) into the AMI bit adapted to the passive bus 12b (TE→NT), based on the timing signal derived from a timing extracting circuit (TME) 748, and then supplies the AMI bit sequence to a bus driver (BD) 746. The BD (746) converts the bit sequence of the AMT code into an electric signal with levels and polarity adapted to the passive bus 12b to send it on the passive bus 12b. A bus receiver (BR) 747 converts the electric signal on the passive bus 12a (NT→TE) into the AMI code capable of being handled in the multiplexer-demultiplexer (MDX) 74 to then supply the AMI code to a decoder (DEC) 745, the timing extracting circuit (TME) 748 and a frame synchronization circuit (FRS) 743. The TME (748) extracts a timing signal for transmission/reception of a signal from the received signal delivered from the NT, and supplies the extracted timing signal to the COD (744) and FRS (743). The decoder (DEC) 745 converts the AMT code from the BR (747) into a multiplexed bit sequence having a normal bit level, based on the timing signal supplied by the TME (748), and feeds the multiplexed bit sequence to a demultiplexer (DMX) 742. The DMX demultiplexes the multiplexed bit sequence from the DEC (745) into the channels B1, B2, D and E, and the other control bits such as the $F_A$-bit 44 and the S1-bit 41. The frame synchronization circuit (FRS) 743 extracts a frame alignment signal from the AMT code sequence received from the passive bus 12a, based on the timing signal derived from the TME (748), and then feeds a received frame alignment signal and a transmitted frame alignment signal to the DMX (742) and the MUX (741). The multiframe control circuit (MFC) 72 establishes the multiframe alignment based on the frame alignment signal and $F_A$-bit 44 provided by the FRS (743) and then generates the $F_A$-bit 52 from the x-bit 521 fed from the local communication controller (ICC) 71 and the multiframe alignment signal from the FRS. The high-level terminal function circuit (HTF) 70, looking up the logical value of the S1-bit 41, can determines whether or not the loop-backed connection for the local communication is being established between the B1-channel and the B2-channel.

In the embodiment described hereinbefore, all the terminal equipment 21, 22, ..., 28 have the local communication function based on the loop-backed connection, or the configuration of FIG. 8. However, the present invention is not limited to this embodiment and includes such a system that there are connected to the passive bus 12, not only the terminal equipment of FIG. 8 but also terminal equipment satisfying the CCITT recommendation not having the local communication function based on the loop-backed connection between the two B-channels. The terminal equipment defined in the CCITT recommendation always send the signal of binary zero at the position of the x-bit 521, because it does not have the multiframing function of the present invention. Therefore, the loop-backed connection for the local communication is always established as far as the local communication designating bit (IN) 66 is binary one. However, there is no fact that the local communication is requested and thus such a situation is undersirable. Therefore, when the terminal equipment defined in the CCITT recommendation is connected in addition to the terminal equipment with local communication capability of the present invention through the passive bus 12 to the NT (11), the SW (65) is switched to the binary zero to prevent the loop-backed connection for the local communication from being established. By this setting of the SW, the NT can accommodate not only terminal equipment with local communication capability of the present invention but also those made subject to the CCITT recommendation.

From the foregoing, it will now be apparent that a new and improved local communication system among ISDN terminal equipments has been proposed. It should be understood of course that the embodiments disclosed are merely illustrative and are not intended to limit the scope of the invention. Reference should be made to the appended claims, therefore, rather than the specification as indicating the scope of the invention.

What is claimed is:

1. A local communication system among ISDN terminal equipment comprising:
   a plurality of terminal equipment, each of said terminal equipment including a requesting means;
   a network termination unit terminating a subscriber line from a network, said network termination unit including a switching means;
   a passive bus connecting the plurality of terminal equipment to the network termination unit, the passive bus having a two-way communication function containing two two-way circuit-switched communication channels,
   signals on the passive bus being transferred to said network termination unit and said terminal equipment in two directions of transmission according to a predetermined frame structure including bits for the two two-way circuit-switched communication channels,
   a multiframe being configured on the passive bus by combining a predetermined number of frames together by utilizing an auxiliary framing bit in each frame,
   said switching means for coupling two-way circuit-switched communication channels on the passive bus to establish a loop-backed connection for a local communication among the terminal equipment through the network termination unit and for coupling the passive bus with the subscriber line to establish a connection for an external communication,
   said requesting means for requesting the loop-backed connection for the local communication and the connection for the external communication selectively, by controlling the auxiliary framing bits of the frames in the multiframe, wherein
   when the loop-backed connection is requested by one of the terminal equipment, the switching means in the network termination unit changes the connection from the external communication into the loop-backed connection.

2. A local communication system among ISDN terminal equipment according to claim 1, wherein the network termination unit transmits to all the terminal equipment connected to the passive bus, a signal indicating whether or not the loop-backed connection is being established, by using spare bit(s) in the signal on the passive bus.

3. A local communication system among ISDN terminal equipment according to claim 1, wherein the network termination unit comprises a disabling means for disabling the establishment of the loop-backed connection while terminal equipment, which does not have local communication capability, are connected to the passive bus.

* * * * *